United States Patent [19]

Schwen

[11] Patent Number: 4,544,377

[45] Date of Patent: Oct. 1, 1985

[54] GRINDING, LAPPING, AND POLISHING COMPOUNDS

[75] Inventor: Roland Schwen, Friedelsheim, Fed. Rep. of Germany

[73] Assignee: BASF Aktiengesellschaft, Ludwigshafen, Fed. Rep. of Germany

[21] Appl. No.: 595,486

[22] Filed: Mar. 30, 1984

[30] Foreign Application Priority Data

Apr. 23, 1983 [DE] Fed. Rep. of Germany ....... 3314789

[51] Int. Cl.$^4$ ................................................ C09K 3/14
[52] U.S. Cl. ...................................... 51/298; 51/306; 51/308; 106/3
[58] Field of Search ................ 51/298, 306, 307, 308; 106/3

[56] References Cited

U.S. PATENT DOCUMENTS

| | | | |
|---|---|---|---|
| 2,062,671 | 12/1936 | Lupo, Jr. | 51/306 |
| 2,129,377 | 9/1938 | Libovitz et al. | 51/306 |
| 2,944,879 | 7/1960 | Allen et al. | 51/306 |
| 2,944,880 | 7/1960 | Allen et al. | 51/306 |
| 3,053,646 | 9/1962 | Roth | 51/298 |
| 4,038,048 | 7/1977 | Thrower, Jr. | 51/298 |
| 4,242,842 | 1/1981 | Yancey | 51/298 |

OTHER PUBLICATIONS

The Condensed Chemical Dictionary, Eight Edition, Van Nostrand Reinhold, 1971, pp. 171 and 936.

*Primary Examiner*—Paul Lieberman
*Assistant Examiner*—Willie Thompson
*Attorney, Agent, or Firm*—Bernhard R. Swick

[57] ABSTRACT

Grinding, lapping, and polishing compounds containing an abrasive material, a thickener, and a water-soluble alkylene oxide polymer. In addition to good applications-related characteristics, said compounds have the advantage of permitting the workpieces to be cleaned with water.

13 Claims, No Drawings

GRINDING, LAPPING, AND POLISHING COMPOUNDS

BACKGROUND OF THE INVENTION

1. Field of the Invention

This invention relates to grinding, lapping, and polishing compounds whose residues can be removed from the workpiece with water and whose vehicles have good lubricating properties.

2. Description of Current Problems

Abrasive materials are often used in surface finishing as part of machining operations. Metals and other materials may be machined with abrasive materials which are solidly bonded together (whetstones, grinding wheels, cutting wheels, abrasive cloths and papers), loose abrasives are also conventionally used.

These loose abrasives are mixed with either liquids or greases and applied to the workpiece; the desired degree of material removal is achieved by movement relative to an abutting surface. The abutting surface can either be a different part of the workpiece itself or can be a special tool surface (ranging from lapping disks to lamb's wool).

In using such abrasives, the removal of oil- or grease-based abrasive compounds from the treated workpiece frequently causes problems, especially when the workpiece has recesses. In order to remove residual abrasive compounds, the workpiece must then be treated with a cleaning fluid. Aside from the danger of working with this solvent, there is the additional danger that some abrasive grains may remain on the workpiece or return to the workpiece from cleaning fluid which is not continually replaced.

Therefore, it has already been suggested that the workpiece be coated with a water-soluble film-forming or viscous material, so that the workpiece can be cleaned with water after the grinding or polishing process has been completed. However, this technique has the disadvantage that two operations are required.

In addition, grinding compounds with water or aqueous emulsions are known. These compounds, however, frequently have the applications-related disadvantage that their vehicles do not have sufficient lubricating properties and thus produce deep scratches.

Thus, the task was to find grinding, lapping, and polishing compounds which neither had the disadvantages of requiring washing with cleaning fluid nor requiring a two-step process and whose vehicles would exhibit good lubricating properties.

SUMMARY OF THE INVENTION

The above objectives are met with the grinding, lapping, and polishing compounds of this invention which contain (a) a finely dispersed abrasive material
(b) a thickener, and
(c) a water-soluble alkylene oxide polymer as a paste vehicle.

DETAILED DESCRIPTION OF THE INVENTION

Typical abrasive materials are Vienna polishing chalk, iron oxide red, diatomaceous earth, pumice powder, quartz sand, chromium trioxide, corundum, silicon carbide, boron carbide, boron nitride, and diamond powder, whereby particle sizes used in grinding generally range from about 1 to 1200 μm. Preferably, standard commercial, closely graded grain size classes per DIN 848 and DIN 69 101 are used.

The thickeners which are primarily used are inorganic substances with large internal surface areas and particle sizes of less than 50 nm (nanometers). Finely dispersed silicic acid, in particular silicic acid obtained through the pyrolysis of silicon tetrachloride, is used. This latter silicic acid can be obtained commercially, for example, under the name Aerosil ® silica. As used herein, the term "silica" includes silicic acids.

Typical alkylene oxide polymers are water-soluble polyglycols of ethylene oxide, propylene oxide or butylene oxide or their monoalkyl ethers with low-molecular weight alcohols. The polymers should, for greatest effectiveness, have a viscosity of from 22 to 1500 mm/s at 40° C. Accordingly, the polymers have a molecular weight from 500 to 25,000, preferably from 2000 to 4000. Particularly preferred are the (statistical) addition products of ethylene oxide and propylene oxide on butanol, whereby the addition is performed at 40° up to a viscosity of, e.g., 320 mm$^2$/s.

The grinding, lapping, and polishing compounds contain, as a rule, from 10 to 70, preferably from 2 to 50, weight percent abrasive material based on the compound.

The thickener content is most efficaciously from 5 to 15, preferably from 5 to 10 weight percent, based on the compound.

The remainder of the compound consists of the alkylene oxide polymer, whereby additional known additives such as colorants can be included in the compounds.

In particular, the compounds can also contain water to adjust the viscosity depending in the intended application.

The compounds of the invention are characterized by a multitude of applications-related advantages. The grinding, lapping, and polishing compounds can be washed off after the machining process has been completed. This eliminates the need to work with cleaning fluid, which is dangerous and is associated with other disadvantages.

The abrasive compounds of the invention exhibit improved lubrication properties through the use of the glycol etherols. These lubricating properties are very important for obtaining a uniform peak-to-valley depth and to assure that dry abrasion does not take place at any location. At such dry locations, the friction between the workpiece, the abrasive powder, and the surface abutting the workpiece would increase to such an extent that relatively large particles of material would separate from one of the two surfaces causing deep scratches. Such inadequate lubrication is very much feared in production: thus, the grinding time with standard commercial compounds is limited and the compounds must be replaced at relatively frequent intervals with a great loss in time, even though the actual abrasive components have not been consumed and the desired degree of machining has not yet been achieved. Said disadvantages are eliminated by the abrasive compounds of the invention.

EXAMPLE 1

Fifteen parts of an adduct obtained by reacting a mixture of 55 weight percent ethylene oxide and 45 weight percent propylene oxide on an n-butanol initiator up to a viscosity of 220 mm$^2$/sec. at 40° C. and one part Aerosil ®200 (Degussa) silica produced a glassy-clear, water-soluble, highly lubricating grease to which four parts grade 100 silicon carbide were added (DIN 69101).

EXAMPLE 2

The same procedure was used as in Example 1, however, employing four parts 600 grade silicon carbide.

The following Table describes additional compounds with the same vehicle. TABLE

| Example | Vehicle | Thickener | Abrasive Material |
| --- | --- | --- | --- |
| 3 | As in Example 1 100 parts | Aerosil 200 7 parts | Silicon carbide, 150 grade 27 parts |
| 4 | As in Example 1 100 parts | Aerosil 200 7 parts | Silicon carbide, 50 grade 107 parts |
| 5 | As in Example 1 100 parts | Aerosil 200 7 parts | Boron carbide, 1200 grade 46 parts |
| 6 | As in Example 1 100 parts | Aerosil 200 7 parts 6 parts | Chromium oxide green 19 parts |
| 7 | As in Example 1 100 parts | 7 parts | 107 parts pumice powder |

All the compounds were mixed together in one operation at room temperature in a suitable, slow-turning mixer.

The embodiments of the invention in which an exclusive privilege or property is claimed are defined as follows:

1. A grinding, lapping, and polishing compound comprising
   (a) from about 10% by weight to about 70% by weight finely dispersed abrasive material,
   (b) from about 5% by weight to about 15% by weight thickening agent, and,
   (c) from about 15% by weight to about 85% by weight polymeric glycol of ethylene oxide, propylene oxide, and/or butylene oxide or its monoethers with a low-molecular-weight alcohol having a molecular weight of about 55 to 25,000 as the compound base, all percentages based on the compound weight.

2. The grinding, lapping and polishing compound of claim 1, wherein said abrasive material has a particle size of about 1 to 1200 μm and said thickener has a particle size of less than about 50 nm.

3. The grinding, lapping, and polishing compound of claim 1, wherein said compound contains finely dispersed silica as the thickening agent (b).

4. The grinding, lapping, and polishing compound of claim 3, wherein said abrasive material has a particle size of about 1 to 1200 μm, said thickener has a particle size of less than about 50 nm and said polymeric glycol has a viscosity of about 22 to 1500 mm/s at 40° C.

5. The grinding, lapping and polishing compound of claim 4, wherein said abrasives are selected from the group consisting of Vienna polishing chalk, iron oxide red, diatomaceous earth, pumice powder, quartz sand, chromium trioxide, corundum, silicon carbide, boron carbide, boron nitride, and diamond powder.

6. The grinding, lapping and polishing compound of claim 4, wherein said abrasive is silicon carbide.

7. The grinding, lapping and polishing compound of claim 4, wherein said abrasive is chromium oxide.

8. The grinding, lapping and polishing compounds of claim 4, wherein said abrasive is boron carbide.

9. The grinding, lapping and polishing compound of claim 4, wherein said abrasive is pumice powder.

10. The grinding, lapping, and polishing compound of claim 1, wherein said polymeric glycol (c) is a polyglycol monoalkylether of ethylene oxide and/or propylene oxide.

11. The grinding, lapping and polishing compound of claim 1, wherein said polymeric glycol (c) is the addition product of ethylene oxide and propylene oxide to a butanol base.

12. The grinding, lapping and polishing compound of claim 11, including conventional additives.

13. The grinding, lapping and polishing compound of claim 12, wherein said additives include coloring materials.

* * * * *